United States Patent [19]

Suzuki et al.

[11] Patent Number: 5,751,358

[45] Date of Patent: May 12, 1998

[54] VIDEO ENCODER WITH QUANTIZATION CONTROLLED BY INTER-PICTURE CORRELATION

[75] Inventors: Kazuhiro Suzuki, Kanagawa; Satoshi Mitsuhashi, Tokyo; Yuji Ando, Kanagawa, all of Japan

[73] Assignee: Sony Corporation, Tokyo, Japan

[21] Appl. No.: 534,857

[22] Filed: Sep. 27, 1995

[30] Foreign Application Priority Data

Sep. 29, 1994 [JP] Japan .................... 6-235103

[51] Int. Cl.$^6$ .................................... H04N 7/32
[52] U.S. Cl. .................................... 348/405; 348/419
[58] Field of Search .................... 348/405, 419, 348/416, 415, 409, 404, 403, 402, 401, 400, 390, 384; 382/251, 238, 236, 232; 341/200; H04N 7/137

[56] References Cited

U.S. PATENT DOCUMENTS

| 5,089,888 | 2/1992 | Zdepski et al. | 348/405 |
| 5,245,427 | 9/1993 | Kunihiro | 348/400 |
| 5,412,431 | 5/1995 | Vogel | 348/405 |
| 5,521,643 | 5/1996 | Yim | 348/405 |
| 5,568,184 | 10/1996 | Shibata et al. | 348/15 |

Primary Examiner—Bryan S. Tung
Attorney, Agent, or Firm—William S. Frommer; Alvin Sinderbrand

[57] ABSTRACT

A method and apparatus for encoding a picture with improved prediction accuracy in predicting the basic quantization step. The apparatus for encoding a picture includes a picture data storage unit, a picture information evaluating unit, an inter-picture correlation detection unit, an orthogonal transform unit for orthogonally transforming the picture data for generating orthogonal transform coefficients, a quantization unit for quantizing the orthogonal transform coefficients produced by the orthogonal transform unit at a pre-set quantization step, an adaptive compression method selection unit and a quantization step control unit. The information quantity is evaluated from stored picture data of plural pictures, and the inter-picture correlation is detected. A picture data compression method is adaptively selected based upon the evaluated value of the information quantity and the inter-picture correlation information. The basic quantization step is predicted from the evaluated value and a pre-set compressed data quantity obtained on compressing one-picture picture data by the selected compression method and the evaluated value.

4 Claims, 9 Drawing Sheets

VIDEO ENCODER WITH QUANTIZATION CONTROLLED BY INTER-PICTURE CORRELATION

BACKGROUND OF THE INVENTION

1. Field of the Invention

This invention relates to a method and apparatus for encoding a picture advantageously employed for encoding a picture by way of data compression.

2. Description of Related Art

FIG. 1 shows a conventional arrangement of a device conveniently employed for encoding a moving picture by way of data compression. With the picture encoding device shown in FIG. 1, digitized picture data of luminance components (Y), chroma components (Cb) and chroma components (Cr), with the numbers of pixels equal to 352(H)×240 (V)×30 frames, 174(H)×120(V) ×30 frames and 174(H)× 120(V)×30 frames, respectively, are fed to an input terminal 1.

The input picture data, entering the input terminal 1, is sent to a motion detector 20 and a block division unit 22 via a frame memory 10 configured for transiently storing the input picture data and re-arraying the picture data according to a pre-set sequence.

The block division unit 11 divides luminance components (Y) and chroma components (Cr), (Cb) of each frame supplied from the frame memory 10 into 8×8 pixel blocks, as shown in FIG. 3. The four blocks of the luminance components (Y0, Y1, Y2 and Y3), one chroma block (Cb) and one chroma block (Cr), totalling six blocks (Y0, Y1, Y2, Y3, Cb and Cr), are termed a macro-block.

The macro-bloc-based data from the block division unit 11 are sent to s subtractive unit 12.

The subtractive unit 12 finds a difference between data from the block division unit 11 and inter-frame predictively coded picture data as later explained and sends the resulting difference to a fixed terminal b of a changeover switch 13 as data for inter-frame predictive coding, as will be explained subsequently. The data from the block division unit 11 is supplied to the other fixed terminal a of the changeover switch 13 as data of a frame for intra-frame coding, as also will be explained subsequently.

The block-based data from the changeover switch 13 is transformed by DCT by a DCT circuit 14 from which the resulting DCT coefficients are sent to a quantizer 15. The quantizer 15 quantizes the DCT output with a pre-set quantization step width and the resulting quantized coefficients are sent to a zig-zag scan circuit 16.

The zig-zag scan circuit 16 re-arrays the quantized coefficients according to zig-zag scan as shown in FIG. 4 and sends the resulting output to a variable length encoding circuit 17. The variable length encoding circuit 17 variable length encodes output data of the zig-zag scan circuit 16 and sends the resulting output to an output buffer 18 while sending the information specifying the quantity of codes generated by variable length encoding to a quantization step controller 19. The quantization step controller 19 controls the quantization step width of the quantizer 15 based upon the information specifying the quantity of codes from the variable length encoding circuit 17. Output data of the output buffer 18 is outputted as a compressed coded output at an output terminal 2.

An output of the quantizer 15 is de-quantized by a de-quantizer 27 and inverse-transformed by an inverse DCT circuit 26. An output of the inverse DCT circuit 26 is sent to an addition unit 25.

The addition unit 25 is also fed with inter-frame predictively coded picture data from a motion compensation unit 21 via a changeover switch 24 which is turned on for a frame produced by inter-frame predictive coding. Thus the inter-frame predicted picture data is summed to the output data of the inverse DCT circuit 26. Output data of the addition unit 25 is temporarily stored in a frame memory 22 and thence supplied to a motion compensation unit 21.

The motion compensation unit 21 effects motion compensation based upon the motion vector detected by the motion detection unit 20 and outputs the resulting inter-frame predictively-coded picture data.

An illustrative sequence of operations of the conventional picture encoder shown in FIG. 1 is explained in detail. For convenience in explanation, the following appellation is used for the respective frames.

The frames arrayed in the display sequence are termed I0, B1, B2, P3, B4, B5, P6, B7, B8, I9, B10, B11, B12, . . . . . Of these frames, I, P and B refer to the sorts of the methods for data compression, as later explained, and the numerals next to I, P and B simply indicate the display sequence.

For compressing these pictures, the MPEG 1 of the MPEG (Moving Picture Expert Group) which is a work group for international standardization of the color moving picture encoding system, provides the following.

First, the picture I0 is compressed by DCT, quantization and VLC.

Next, the picture P3 is compressed. At this time, it is not the picture P3 itself but difference data between P3 and I0 that is compressed.

Next, the picture B1 is compressed. At this time, it is not the picture B1 itself, but difference data between the pictures B1 and I0, difference data between pictures B1 and I0, between pictures B1 and P3 or between the picture B1 and mean values of the pictures I0 and P3, whichever is smaller in the information volume, that is compressed.

Next, the picture B2 is compressed. At this time, it is not the picture B2 itself, but difference data between the pictures B2 and I0, difference data between pictures B2 and P3 or a difference between the picture B2 and the mean values of the pictures I0 and P3, whichever is smaller in the information volume, that is compressed.

Next, the picture P6 is compressed. At this time, it is not the picture P6 itself, but difference data between the pictures P6 and P3, that is compressed.

The following describes the above-described processing in the sequence in which it is executed.

| Pictures to be Processed | Counterpart for Taking Difference |
|---|---|
| (1) I0 | — |
| (2) P3 | I0 |
| (3) B1 | I0 or P3 |
| (4) B2 | I0 or P3 |
| (5) P6 | P3 |
| (6) B4 | P3 or P6 |
| (7) B5 | P3 or P6 |
| (8) P9 | P6 |
| (9) B7 | P6 or P9 |
| (10) B8 | P6 or P9 |
| (11) I9 | — |
| (12) P12 | I0 |
| (13) B10 | I9 or P12 |
| (14) B11 | I9 or P12 |

In this manner, the encoding sequence is I0, P3, B1, B2, P6, B4, B5, P9, B7, B8, I9, P12, B10, B11, . . . and thus changed from the display sequence. The compressed data, that is encoded data, are arrayed in this encoded sequence.

The above is explained in further detail along with the operation of the picture encoding device shown in FIG. 1.

In encoding the first picture I0, data of a picture to be compressed first are outputted by the frame memory 10 and blocked by the block dividing unit 11. The block dividing unit 11 outputs block-based data in the sequence of Y0, Y1, Y2, Y3, Cb and Cr. The block-based output data is routed via the changeover switch 13 set to the side of the fixed terminal a to the DCT circuit 14. The DCT circuit 14 orthogonally transforms the block-based data with two-dimensional discrete cosine transform. This converts data from the time axis into that on the frequency axis.

The DCT coefficients from the DCT circuit 14 are sent to the quantizer 15 where it is quantized at a pre-set quantization step width. The DCT coefficients are then re-arrayed in a zig-zag sequence by the zig-zag scan circuit 16 as shown in FIG. 4. If the DCT coefficients are arrayed in a zig-zag sequence, the coefficient values are those of higher frequency components towards the back so that the coefficient values become smaller towards the back. Thus, if the coefficient data are quantized at a certain value S, the probability of the result of quantization becoming zero becomes higher towards the back so that higher frequency components are removed.

The quantized coefficients are then sent to the variable length coding (VLC) circuit 17 so as to be processed with Huffman coding. The resulting compressed bitstream is temporarily stored in the output buffer 18 and thence outputted at a pre-set bit rate. The output buffer 18 is a buffer memory for outputting an irregularly generated bitstream at a pre-set bit rate.

The above-described compression of a sole picture is termed intra-frame coding and the resulting picture is termed an I-picture.

A decoder receiving the bitstream of the I-picture performs an operation which is the reverse of the above-described operation for completing the first picture.

The second picture, that is the picture P3, is encoded in the following manner.

The second picture and ff. may be compressed as I-pictures to generate a bitstream. However, for improving the compression ratio, the second picture ff. are compressed in the following manner for taking advantage of correlation between the contents of the continuous pictures.

First, the motion detection unit 20 finds, in the first picture I0, a pattern similar to each macro-block constituting the second picture, and represents the pattern in terms of coordinates of relative positions (x, y) termed a motion vector.

If the correlation between the pattern of the first picture represented by the motion vector and the pattern of the block now to be encoded is extremely strong, the difference data becomes extremely small, so that the amount of compressed data becomes smaller when the motion vector and the difference data are encoded than when the block is compressed by the intra-frame coding.

The above-described compression method is termed the inter-frame predictive coding. The difference data is not necessarily smaller and, depending upon the picture pattern, that is the contents of the picture, the compression ratio becomes higher with intra-frame coding than with coding the difference data. In such case, data is compressed by the intra-frame coding. Which of the inter-frame predictive coding or the intra-frame coding is to be employed differs from one macro-block to another.

If the above is to be explained in connection with the picture encoder shown in FIG. 1, the picture which is the same as the picture produced on the decoder side needs to be produced on the encoder side at all times if the inter-frame predictive coding is to be achieved.

To this end, there is provided in the encoder a circuit which is the same as the decoder. This circuit, termed a local decoder, includes the inverse DCT circuit 27, inverse DCT circuit 26, addition unit 25, frame memory 22 and the motion compensation unit 21 shown in FIG. 1. The picture stored in the frame memory 22 is termed a locally decoded picture or locally decoded data. The data of a picture not yet compressed is termed an original picture or original data.

During compression of the first picture, that is the I-picture I0, the first picture decoded by the local decoder is stored in the frame memory 22. Noteworthy is the fact that the picture produced by the local decoder is not the pre-compression data but is the compressed and decoded picture and hence is the same picture as the picture which is to be decoded by the decoder and thus suffers from deterioration in the picture quality ascribable to compression.

It is to the encoder under such condition that data of the second picture P3 (original data) is entered. The motion vector must have been pre-detected by this time. Such data has the motion vector from block to block. Such motion vector is supplied to the motion compensation unit 21. The motion compensation unit 21 outputs data on the locally decoded partial picture specified by the motion vector (motion compensated data or MC data: one macro-block) as the inter-frame predicted picture data.

Pixel-based difference data from the subtractive unit 12 between the second original data and the motion compensated data (inter-frame predicted picture data) enters the DCT circuit 14. The method for compression since this time is basically the same as that for the I-picture. The picture compressed by the above-described compressing method is termed the forward predictive coded picture or P-picture.

More specifically, all macro-blocks of the P-picture are not necessarily compressed by the inter-frame predictive coding. If intra-frame coding is judged to give a higher coding efficiency for a given macro-block, the macro-block is encoded by intra-frame coding.

That is, with the P-picture, the intra-frame coding or the inter-frame predictive coding is selected for compression from one macro-block to another. The macro-block coded by intra-frame coding and that coded by inter-frame predictive coding are termed an intra-macro-block and an inter-macro-block, respectively.

With the above local decoder, as described above, an output of the quantizer 15 is de-quantized by the de-quantizer 27 and inverse orthogonal transformed by the inverse DCT circuit 26. During encoding, the motion-compensated data (MC data) is added to the output of the inverse DCT circuit 26 to give an ultimate locally decoded picture.

The third picture, that is the picture B1, is encoded in the following manner.

For encoding the third picture (B1 picture), the motion vector for each of the pictures I0 and P3 is searched. The motion vector for the picture I0 is termed the forward vector MVf(x,y), while the motion vector for the picture P3 is termed the backward vector MVb(x,y).

For this third picture, difference data is similarly compressed. It matters which data should be compressed. It is sufficient if the difference is taken with respect to a picture which will give the smallest amount of the information by difference taking. There are four alternatives for the method for compression, namely (1) employing the difference from data on the picture I0 indicated by the forward vector MVf(x,y);
(2) employing the difference from data on the picture P3 indicated by the backward vector MVb(x,y);
(3) employing the difference between mean values of data on the picture I0 indicated by the forward vector MVf(x,y) and data on the picture P3 indicated by the backward vector MVb(x,y); and
(4) not employing the difference, that is encoding the third picture by intra-frame coding.

One of these four methods for compression is selected on the macro-block basis. With the alternatives (1) to (3), the respective motion vectors are sent to the motion compensation unit 21. The subtractive unit 12 takes the difference between the macro-block data and the motion-compensated data. The resulting difference is sent to the DCT circuit 14. With the alternative (4), the data is directly sent to the DCT circuit 14.

The above-described operation becomes feasible since two pictures, namely the pictures I0 and P3, have been-restored by the encoding of the first and second pictures in the frame memory 22 configured for storing the locally decoded picture.

The fourth picture, that is the picture B2, is encoded in the following manner.

The encoding of the fourth picture B2 is carried out in the same manner as for the encoding of the third picture B1 except that "B1" in the previous description of the encoding method for the third picture B1 now reads "B2".

The fifth picture, that is the picture P6, is encoded in the following manner.

The encoding of the fifth picture P6 is carried out in the same manner as for the encoding of the second picture P3 except that "P3" and "I0" in the previous description of the encoding method for the second picture P3 now read "P6" and "P2", respectively.

The encoding of the sixth picture ff. is not made since it is the repetition of the above-described encoding operations.

The MPEG provides a group-of-picture (GOP).

That is, a group of plural pictures is termed a group-of-pictures (GOP). The GOP must consist of continuous pictures in terms of the encoded data, that is the compressed data. On the other hand, the GOP takes account of random accessing and, to this end, the first picture in the GOP needs to be the I-picture. In addition, the last picture in the GOP in the display sequence must be an I-picture or a P-picture.

FIG. 5 shows an example in which the first GOP consists of four pictures and the second GOP ff. consist of six pictures. FIGS. 5A and 5B illustrate the display sequence and the sequence of the encoded data, respectively.

If, in FIG. 5, attention is directed to the GOP2, since the pictures B4 and B5 are formed from the pictures P3 and I6, the pictures B4 and B5 cannot be decoded correctly if the picture I6 is accessed by random access, since there is not the picture P3. The GOP which cannot be correctly decoded within itself is said to be not closed.

Conversely, if the pictures B4 and B5 only refer to the picture I6, the pictures B4 and B5 can be decoded correctly if the pictures B4 and B5 access the picture I6 by random access, since the picture P3 is not required. The GOP which can be fully decoded from the information within itself is said to be closed.

Data compression is performed by the most efficient one of the above-described compressing methods. The quantity of the encoded data thus generated also depends on the input picture and can be known only after actual data compression.

However, it is also necessary to manage control for providing a constant bit rate of the compressed data. The parameter for managing such control includes the quantization step or quantization scale (Q-scale) as the information specifying the quantity of the codes applied to the quantizer 15. The larger or smaller the quantization step, the smaller and larger is the quantity of generated bits for the same compression method.

The value of the quantization step is controlled in the following manner.

For assuring a constant bit rate of the compressed data, the output buffer 18 is provided at an output of the encoder. The output buffer operates for absorbing the difference in the difference in the amount of the generated data within a certain extent from picture to picture.

However, if data is generated at a rate surpassing a pre-set rate, the residual data quantity in the output buffer 18 is increased thus producing data overflow. Conversely, if data is generated at a rate lower than the bit rate, the residual data quantity in the output buffer is decreased thus ultimately producing data underflow.

Thus the encoder is configured for feeding back the residual data quantity in the output buffer 18 so that the quantization step controller 19 controls the quantization step of the quantizer 15, in such a manner that, if the residual data quantity in the output buffer 18 becomes smaller, the quantization step is controlled to be smaller to refrain from excessive compression and, if the residual data quantity of the output buffer 18 becomes larger, the quantization step is controlled to be larger to raise the compression ratio.

On the other hand, there exists a considerable difference in the range of the quantity of the encoded data generated by the above-described compressing method (the above-described intra-frame coding and inter-frame coding).

If data compression is performed by the intra-frame coding, a large quantity of data is produced, so that, if the vacant capacity of the output buffer 18 is small, the quantization step size needs to be increased. If the quantization step size is maximized, data overflow in the output buffer 18 may occasionally be produced. If the generated data can be stored in the buffer 18, the intra-frame encoded picture produced with a larger quantization step affects the picture quality of subsequently produced inter-frame predictively-coded pictures. In this consideration, a sufficient vacant capacity of the output buffer 18 is required before proceeding to data compression by intra-frame coding.

Thus the compression method of a pre-set sequence is provided, while the quantization step controller 19 effects feedback control of the quantization step size for assuring a sufficient vacant capacity of the output buffer 18 prior to the intra-frame coding.

The above renders it possible to suppress the bit rate of the encoded data to a pre-set value.

The above-described conventional method has a drawback that high picture quality cannot be achieved for the following reason.

That is, for compressing input pictures, the information quantity of which is changed each time instant, at a pre-set bit rate to a high mean picture quality, it is necessary to allow a larger quantity of the compressed data and a smaller quantity of the compressed data for a picture having a larger quantity of the information and for a picture having a smaller quantity of the information, respectively, in order to assure uniform picture quality insofar as a low bit rate may be maintained by an output buffer. However, this cannot be achieved with the conventional method in the following cases.

Assuming that there occur pictures of smaller quantity of the information in succession, followed by a picture having a larger quantity of the information, the quantization step should not be decreased excessively, while the residual data quantity in the output buffer should be kept small until the encoding of the next oncoming picture with the larger quantity of the information. However, with the above-described system of feeding back the residual data quantity of the output buffer, the residual data quantity in the output buffer is increased while the pictures with the smaller quantity of the information occur in succession.

Conversely, if the picture with a smaller quantity of the information occurs next to the picture with a larger quantity of the information, overflow is not likely to be produced without the necessity of encoding the previously supplied pictures with the larger quantity of the information with a larger quantization step for decreasing the data quantity in the output buffer, because the quantity of the information of the next following picture is small. However, with the above-described system of feeding back the data quantity of the output buffer, since the quantity of the information of the succeeding picture is not known, the data quantity in the output buffer is controlled to be decreased, that is the quantization step is controlled to be decreased, thus lowering the picture quality.

In this consideration, it may be envisaged to evaluate the quantity of the information of the input picture and to control the quantization step based upon this evaluation.

However, if, with the picture encoder having means for evaluating the quantity of the information of the input picture, an input picture is compressed, the number of bits to be allocated to data produced after compressing the input information is set depending upon the quantity (difficulty) of the input picture. In such case, the quantization step of the quantizer needs to be predicted highly accurately in dependence upon the quantity of bit allocation.

If the predicted quantization step is not proper, the quantity of bit allocation possible for post-compression data is not reached or surpassed, thus affecting the bit allocation for compressing the remaining pictures.

Thus, with a frame with a reduced quantity of bit allocation, for example, the quantization step becomes rough thus lowering the picture quality. Consequently, the frames with uniform picture quality do not last long thus giving the impression of poor picture quality to the viewer. If the prediction is upset to a larger extent, buffer overflow or underflow will be incurred in the worst case.

If the quantization step is controlled depending upon the ratio in the picture of the progress of compression, predicted amount of bit allocation and the quantity of the post-compression information, the quantization step in the picture undergoes significant variation within the picture if the basic prediction of the quantization step is upset. Since the compression is performed in the raster scan order, any significant variation in the quantization step in the picture renders striped nonuniform portions of the picture quality apparent in the picture thus lowering the picture quality.

OBJECTS AND SUMMARY OF THE INVENTION

It is therefore an object of the present invention to provide a picture encoding device whereby picture compression may be performed efficiently for improving the picture quality on the whole.

According to the present invention, there is provided an apparatus for encoding a picture including picture data storage means for storing picture data of a plurality of input pictures, picture information evaluating means for evaluating the information quantity of the picture data of the input pictures from the picture data of plural pictures stored in the picture data storage means, inter-picture correlation detection means for detecting the correlation between pictures from the picture data of plural pictures stored in the picture data storage means, orthogonal transform means for orthogonally transforming the picture data for generating orthogonal transform coefficients, quantization means for quantizing the orthogonal transform coefficients produced by the orthogonal transform means at a pre-set quantization step, compression method selection means for adaptively selecting a compression method for the picture data based upon the evaluated value of the information quantity obtained by the picture information evaluating means and the inter-picture correlation information from the inter-picture correlation detection means, and quantization step control means for predicting the basic quantization step for quantization by the quantization means from the evaluated value of the information quantity acquired by the picture information evaluating means and a pre-set compressed data quantity acquired on compressing one-picture picture data in accordance with the compression method selected by the compression method selecting means.

Preferably, the quantization step control means learns the relation between the quantization step actually employed for compression, a post-compression data quantity and the evaluated value for predicting the basic quantization step based upon the learned results. The quantization step control means preferably sums the evaluated value for each macrobock obtained on dividing the picture, for a full picture, to find a summed evaluated value, and employs the resulting summed evaluated value for predicting the basic quantization step. The picture information evaluating means preferably employs a sum of macro-block-based absolute values of a difference between pixel data of a macro-block of a reference picture corresponding to a motion vector obtained by motion detection and pixel data of a macro-block of an input picture as the evaluated value.

Preferably, the quantization step control means sums the evaluated values during a time interval corresponding to a period of intra-frame coding as a unit for effecting bit allocation for quantization by the quantization means. The quantization step control means assumes that the relation between the quantity of picture-based bit allocation for quantization and the sum of the evaluated values is related to each other in a pre-set manner for each of the selected compression methods and calculates the basic quantization step from previously found learning parameters and the pre-set relation. The quantization step control means previously finds the learning parameter by the least square error method from the averaged value of the macro-block-based basic quantization steps over a full picture, post-compression data quantity of one full picture and the evaluated value for one full picture. The quantization step control means finds the learning parameter from the information for past n seconds for each of the compression methods selected by the compression method selection means. The quantization step control means predicts the basic quantization step based upon plural quantization steps found in the past, the quantity of generated bits and the information quantity. The quantization step control means sets upper and lower limits for the offset and the inclination of a straight line segment used for prediction.

According to the present invention, the information quantity is evaluated from stored picture data of plural pictures, and the inter-picture correlation is detected. A picture data compression method is adaptively selected based upon the evaluated value of the information quantity and the inter-picture correlation information. The basic quantization step is predicted from a pre-set compressed data quantity obtained on compressing one-picture picture data by the selected compression method and the evaluated value for raising prediction accuracy in predicting the basic quantization step.

Also the relation between the quantization step used for compression, post-compression data quantity and the evaluated value is learned and the basic quantization step is predicted in dependence upon the learned results for following up with variations in the input picture.

The learning is performed using the information for latest past n seconds for each selected compression method, that is the learned results more than n seconds before the current time point are not used.

The basic quantization step is predicted based upon plural quantization steps as found in the past, generated bit quantity and the information quantity, while upper and lower limits are set for the offset and the inclination of a straight line used for prediction, so that prediction of the basic quantization step is not affected by learning data of peculiar input pictures.

DETAILED DESCRIPTION OF THE PREFERRED EMBODIMENTS

Figure 1:
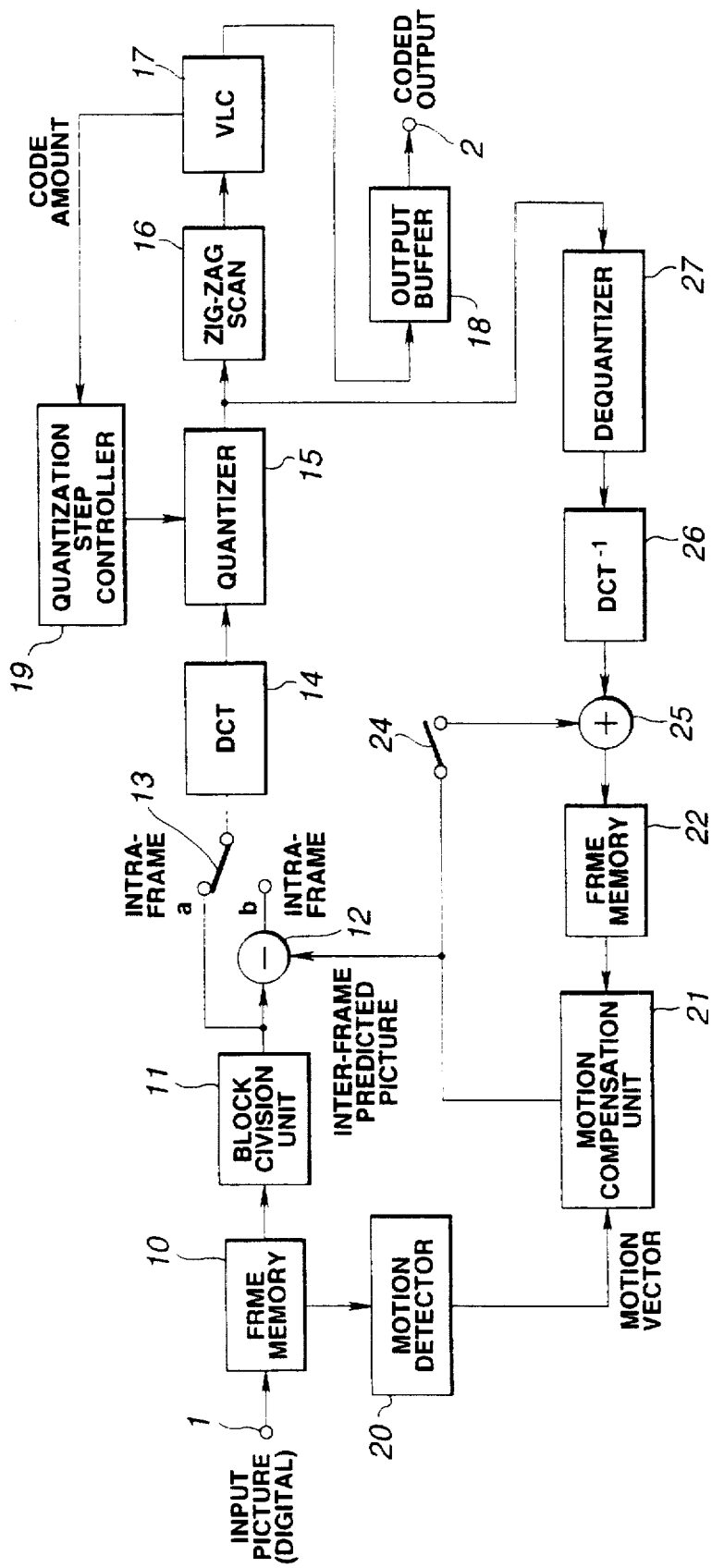
FIG. 1 is a schematic block circuit diagram showing an arrangement of a conventional picture encoder.
Figure 2:
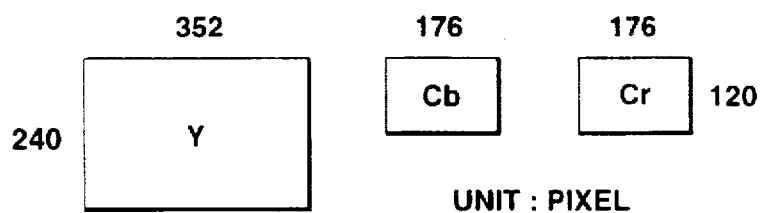
FIG. 2 illustrates the resolution and constitution of a picture.
Figure 3:
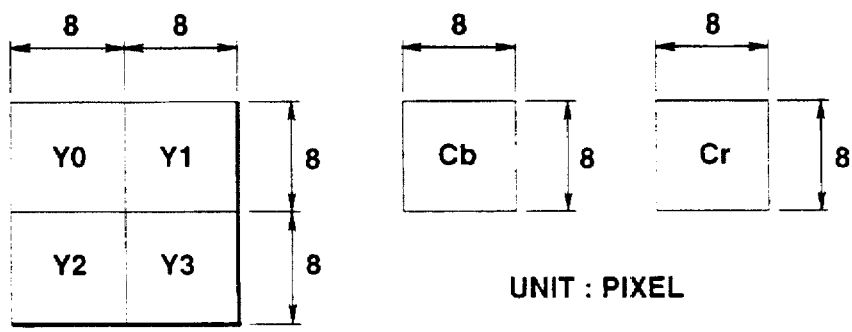
FIG. 3 illustrates a macro-block and blocks.
Figure 4:
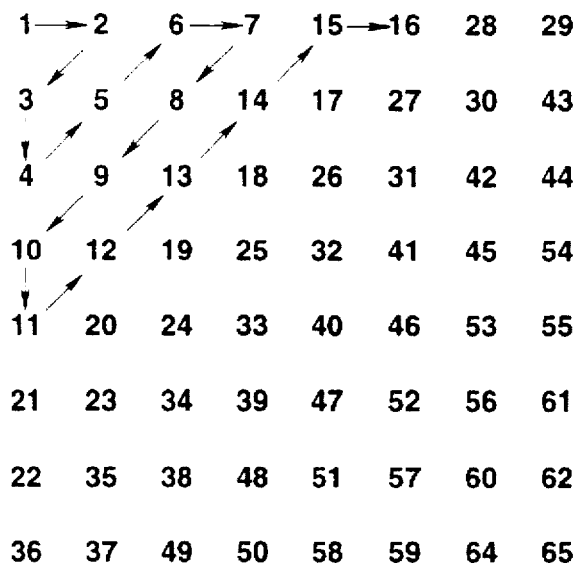
FIG. 4 illustrates zig-zag scanning.
Figure 5A:
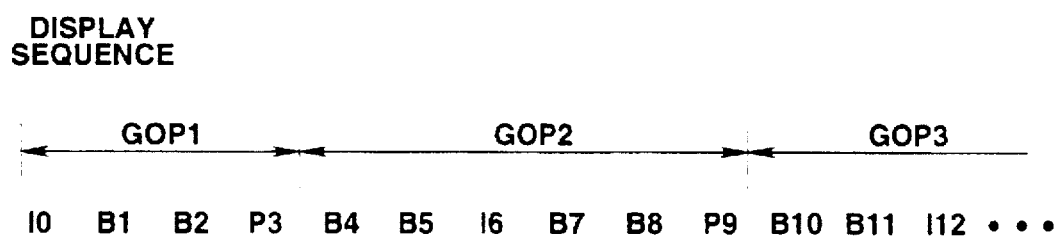
FIGS. 5A and 5B illustrate a typical GOP in its display sequence and encoding sequence, respectively.
Figure 5B:
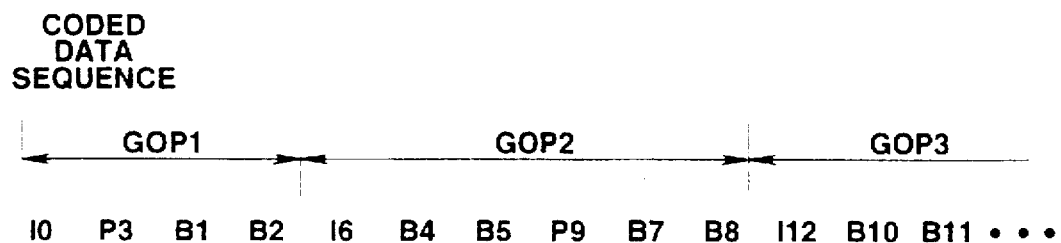

Referring to the drawings,present invention will of the present invention will be described in detail.

Figure 6:
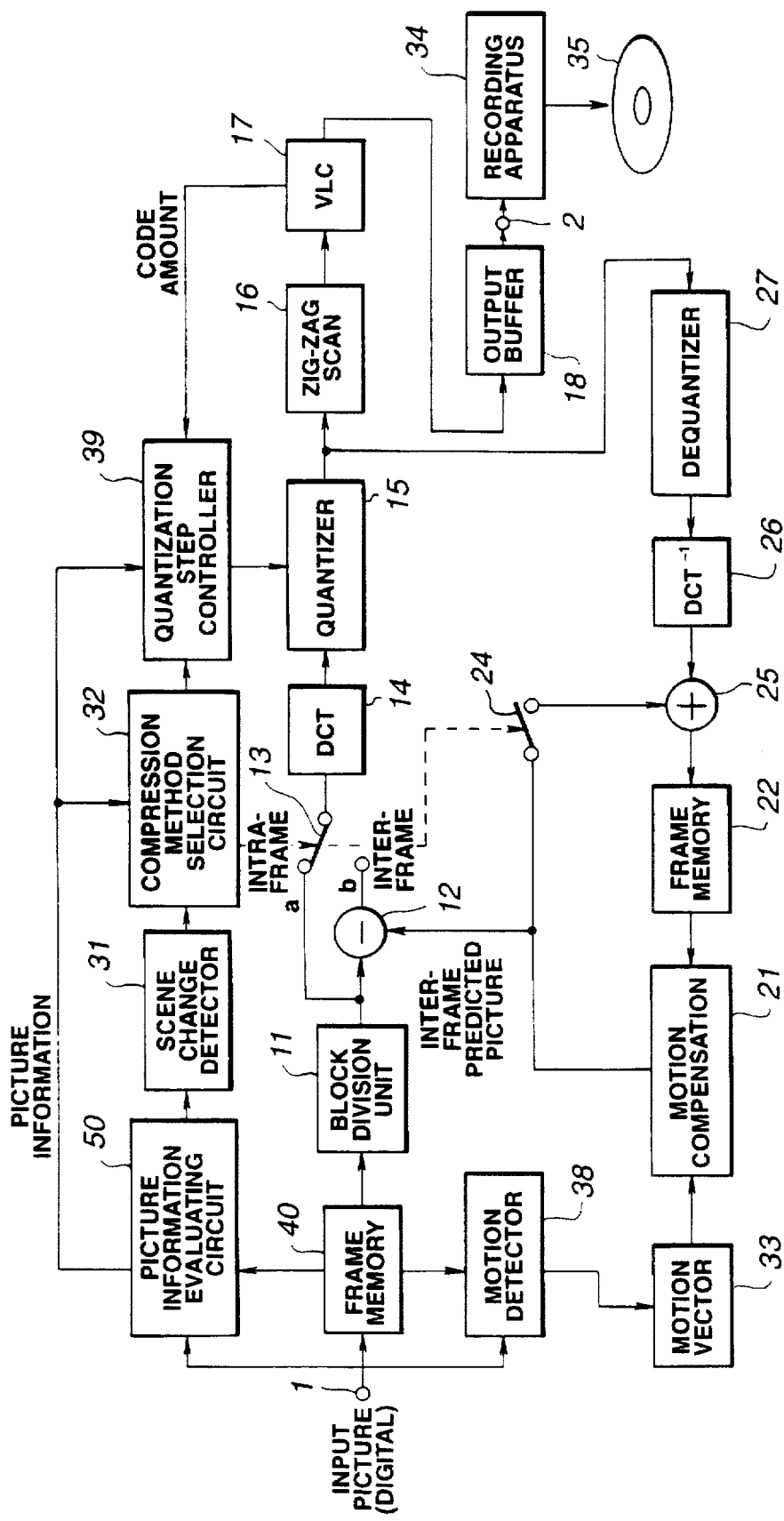
FIG. 6 is a schematic block circuit diagram showing the construction of a picture encoder embodying the present invention.

FIG. 6 shows a schematic arrangement of a picture encoder embodying the present invention. The parts or components similar to those shown in FIG. 1 are depicted by the same numerals and the corresponding description is omitted for clarity.

In the arrangement of FIG. 6, the components added to the arrangement of FIG. 1 are a picture information evaluating circuit 50, a scene change detection circuit 31, a compression method selection circuit 32 and a motion vector generating circuit 33. A motion detector 38, a quantization step controller 39 and a frame memory 40 are modified from the corresponding components of FIG. 1.

Thus the picture encoder of the illustrated embodiment includes a frame memory 40, operating as picture data storage means for storing picture data of plural input pictures, and a picture information evaluation circuit 50 for evaluating the quantity of the information of the input picture data from the picture data stored in the frame memory 40. The picture encoder also includes a scene change detection circuit 31, operating as inter-picture correlation detection means for detecting picture correlation from the plural picture data stored in the frame memory 40, and a DCT circuit 14 for orthogonally transforming the picture data by DCT for generating DCT coefficients. The picture encoder also includes a quantizer 15 for quantizing the DCT coefficients generated by the DCT circuit 14 with a pre-set quantization step, and a compression method selecting circuit 32 for adaptively selecting the picture data compressing methods, such as picture type, macro-block type or GOP length, depending upon the evaluated value of the quantity of information produced by the evaluating circuit 50 and the inter-picture correlation information from the scene change detection circuit 31 (scene change detection output). Finally, the picture encoder includes a quantization step controller 39 for predicting the basic quantization step as used for quantization by the quantizer 15 from the above evaluated value and an estimated quantity of compressed data obtained by compressing one-frame picture data by the compression method selected by the compression method selection circuit 32.

Referring to FIG. 6, input picture data entering an input terminal 1 are stored in the frame memory 40. The frame memory 40 differs from the frame memory 10 of FIG. 8 in that it is capable of storing a pre-set number of frames. The pre-set number of frames is desirably not large for avoiding an excessively large scale of the frame memory 40. The most efficient value of the pre-set number, that is the number of frames, depends significantly on the bit rate, capacity of the output buffer 18 and the distance between pictures by intra-frame coding system, which in many cases corresponds to the GOP length. The reason is that any variations in the size of compressed data caused by difference in the compression methods and the compression ratio can be absorbed by the output buffer 18 to provide a constant bit rate only under a constraint imposed by the above-mentioned conditions such as the bit rate, output buffer capacity and the interval between intra-frame coded pictures.

Meanwhile, compression by the intra-frame coding is carried out periodically. In many cases, these intra-frame coded pictures represent demarcation points between the GOPs. The intra-frame coding system gives a post-compression data quantity which is significantly larger than the data quantity generated with the other coding system, that is the inter-frame predictive coding. Thus it is reasonable to check the quantity of the information at an interval of the intra-frame coded pictures, or at a GOP interval, in order to allocate the data quantity.

However, with the system of the illustrated embodiment, picture compression is by the intra-frame coding system even if the picture correlation is significantly lowered due to e.g., a scene change, as explained subsequently. If intra-frame coding is to be effected at a scene change portion of the input picture data, it becomes difficult to maintain a constant bit rate or a uniform picture quality for a periodically inserted intra-frame coded picture which happens to be located in the vicinity of the intra-frame coded picture inserted responsive to the scene change. Thus the intra-frame coding for the periodically inserted intra-frame coded picture becomes meaningless such that it becomes necessary to relinquish the intra-frame coding.

Thus the recording capacity of the frame memory 40, that is the above-mentioned pre-set number, is desirably selected to be about twice the period of the cyclic intra-frame coding in consideration that there are occasions wherein a scene change is located in the vicinity of the cyclically inserted intra-frame coded picture.

Of course, the above pre-set number is merely illustrative and may be changed as desired in meeting with various operating conditions.

The picture data stored in the frame memory 40 is sent to the picture information evaluation circuit 50.

The picture information evaluation circuit 50 finds roughly two different parameters.

The first parameter specifies the amount of the information for enabling the post-compression quantity of data in case compression is by intra-frame coding. The first parameter may be the sum or statistic values of DCT coefficients obtained by block-based DCT of picture data supplied from the frame memory 40. If the parameter found in this manner is of an excessive scale, it may also be the block-based sums of mean square errors of the DCT coefficients. At any rate, the picture information evaluation circuit 50 finds a parameter which represents the quantity of the picture information and which is sufficient to enable the post-compression data quantity to be inferred.

The second parameter specifies the quantity of the differential picture information which enables the post-compression data quantity to be predicted in case the compression is by the inter-frame predictive coding. The parameter may for example be the in-block sum of the difference values between the picture stored in the frame memory 40 and the motion-compensated picture. For finding the parameter, the least error (minimum difference) for detecting the motion vector, obtained in a common motion vector detection circuit (motion detection unit 38 and the motion vector generating circuit 33) may be employed.

As parameters for inferring or predicting the post-compression data quantity, that is the data quantity after inter-frame prediction coding, the least error found only by the chrominance information for detecting the motion vector is newly employed in addition to the motion vector obtained from the motion vector detection circuit from the luminance information, that is the motion detection unit 38 and the motion vector generating circuit 33, and the least error found only from the luminance information for detecting the motion vector.

In the present encoder, an error for a macro-block is the least error from the luminance information as found in this manner and the least error from the color difference information, and judgment on the compression method is given by the compression method selection circuit 32 using the error of the macro-block.

The evaluated value, that is the parameter, of the picture information as found by the picture information evaluating circuit 50 as described above is sent to the scene change detection circuit 31 as now explained, compression method selection circuit 32 and the quantization step controller 39.

The picture information evaluation circuit 50 also sends the picture information to the compression method selection circuit 32 for counting the number of pictures for deciding the GOP length by the compression method selection circuit 32 as later explained.

The scene change detection circuit 31 detects a scene change using an output of the picture information evaluation circuit 50, such as the second parameter.

The scene change is detected by the scene change detection circuit 31 so as to be used as a material for judgment as to which of the inter-frame predictive coding or the intra-frame coding is to be employed. The reason is that a picture at the scene change exhibiting only low inter-picture correlation can be compressed more efficiently by intra-frame coding than by inter-frame predictive coding. Since the post-compression data quantity is larger at the scene change portion of input picture data, it is crucial to find out the scene change from the viewpoint of data quantity allocation and management of the output buffer.

Since the scene change occurs where the correlation between pictures is significantly lowered, it can be detected by finding the difference between the current picture and a motion vector compensated picture and the difference between the temporally succeeding picture and a motion vector compensated picture, finding the sums of the respective difference values for the entire pictures and finding the ratio between the sums for the two pictures.

Thus the scene change detection circuit 31 of the illustrated embodiment detects the scene change using an output of the picture information evaluation circuit 50. That is, since the picture information evaluation circuit 50 outputs the in-block sums of the difference values of the motion-compensated pictures, as the second parameters, as described above, the scene change detection circuit 31 performs an operation for detecting the scene change using the in-block sums of the difference values.

The compression method selection circuit 32 is now explained.

The compression method selection circuit 32 selects the compression method, that is the intra-frame coding or the inter-frame predictive coding (P and B pictures), based-upon the scene detection output of the scene change detection circuit 31, the count value of the number of the picture information from the picture information evaluation circuit 50 and the second parameters (least errors) as found from the luminance information and the chrominance information.

That is, the compression method selection circuit 32 compares the estimated quantity of data generated by macro-block-based intra-frame coding and by macro-block-based inter-frame predictive coding, based upon the parameters found from the macro-block-based luminance information and the macro-block-based chrominance information by the picture information evaluation circuit 50, and selects the compression method which gives a smaller value of the estimated data quantity.

It is noted that an intra-frame coded picture must be present at least at an initial portion of the GOP. Since the GOP is of a certain length in view of random accessibility, intra-frame coded pictures occur periodically at an interval of the above length. In the illustrated embodiment, the intra-frame coded picture also occurs with scene changes.

In this consideration, the compression method selection circuit 32 counts the number of the picture information from the picture information evaluation circuit 50. In addition, the scene detection output from the scene change detection circuit 31 is supplied to the compression method selection circuit 32. Thus the compression method selection circuit 32 selects the periodic intra-frame encoding, from the picture count value, while selecting the intra-frame coding on scene change detection and selecting the inter-frame predictive coding otherwise.

The compression method selection circuit 32 is responsive to selection of the compression methods to switch between the changeover switches 13 and 24 while sending the information specifying the result of selection to the quantization step controller 39.

The quantization step controller 39 controls the quantization step width of the quantizer 15 based upon the information specifying the code quantity from the variable length encoding circuit 17. Output data of the output buffer 18 is outputted as an encoded output at an output terminal 2.

The encoded output data is written by a recording device 35 on a recording medium 36. Although not shown, the recording device 35 includes an error correction code appending circuit and a modulating circuit. The recording medium 36 is specifically an optical disc which is a master disc for mass-producing ROM discs similar to compact discs. Alternatively, it may be a writable disc.

An output of the quantizer 15 is de-quantized by a dequantizer 27 and inverse discrete cosine transformed by an inverse DCT circuit 26. An output of the inverse DCT circuit 26 is sent to an adder 25.

The adder 25 is also fed with an inter-frame predictively-coded picture data from the motion compensating unit 21 via the changeover switch 24, which is turned on for the inter-frame predictive coded frame, so that an additive operation occurs between the inter-frame predictively-coded picture data and the output data of the inverse DCT circuit 26. Output data of the adder 25 is temporarily stored in the frame memory 22 and thence supplied to the motion compensation unit 21.

The motion compensation unit 21 effects motion compensation, based upon the motion vector detected by the motion detector 38 and generated by the motion vector generating circuit 33, and outputs the resulting inter-frame predictively-coded picture data.

The quantization step controller 39 is apprised of the quantity of the picture information and the portion of picture data where the picture correlation becomes low, such as scene change, from the evaluated value (parameter) from the picture information evaluating circuit 50, while being apprised of which of the intra-frame coded picture or the inter-frame predictively coded picture is the selected picture from the information specifying the result of selection from the compression method selection circuit 32.

Thus it is possible with the quantization step controller 39 to follow rapid changes in the quantity of the input picture information as compared to conventional quantization step control of feeding back only the data quantity in the output buffer 18. In addition, it is possible to control the quantization step appropriately responsive to changes in the quantity of the picture information and to control the quantization step appropriately responsive to the types of the compression methods, that is intra-frame coding/inter-frame predictive coding.

Figure 7:
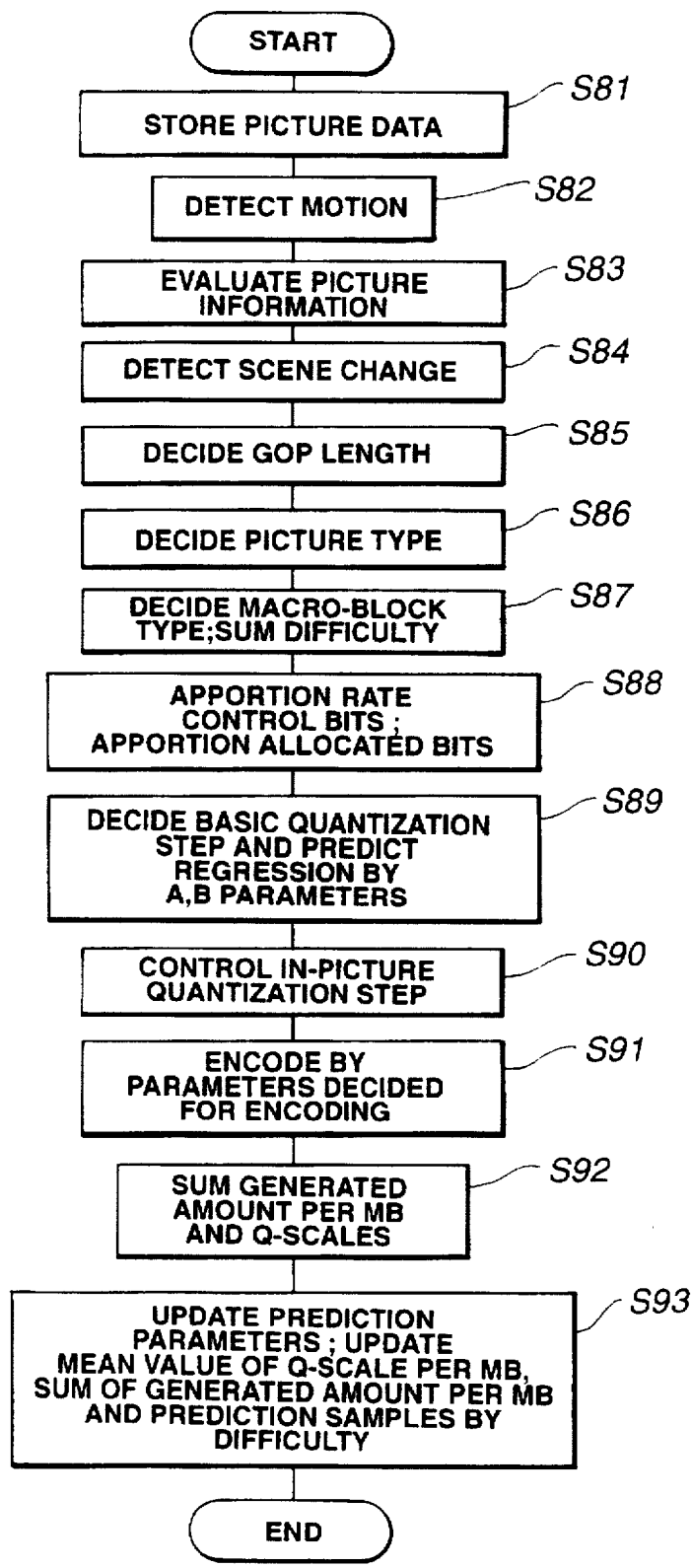
FIG. 7 is a flow chart for illustrating the operation of the picture encoder shown in FIG. 6.

The processing flow in the constitution of the illustrated embodiment is explained by referring to the flow chart of FIG. 7.

At step S81, picture data entering the input terminal 1 is sequentially stored in the frame memory 40.

Since the frequency of and the interval between the I-pictures affect the picture quality, as stated above, it is necessary to determine the GOP before proceeding to encoding. In addition, the information on the pictures for one GOP needs to be collected before encoding in order to control the bit rate by controlling the quantization step. Thus the frame memory 40 of a large storage capacity is employed for assuring sufficient delay time for analyzing the picture data as it is entered and for encoding the input picture data.

Then, at step S82, the motion vector required for compression by inter-frame predictive coding is detected and generated by the motion detector 38 and the motion vector generating circuit 33, respectively. That is, at the present step S82, motion detection (motion estimation) is performed for compression-encoding picture data in the frame memory 40 as P-pictures or B-pictures in accordance with the pre-set schedule.

The I-pictures are not defined as pictures for motion compensation. The reason is that it is not fixed at this time moment which of the picture data since the I-pictures and, since the I-pictures are not in need of motion compensation, any picture data can later become the I-pictures.

The picture information evaluation circuit 50 reads out and stores the minimum distortion or the sum of absolute difference values or absolute difference AD, employed at the time of motion detection, as a parameter for encoding (second parameter).

Meanwhile, the sum of absolute difference values or absolute difference AD is the sum of absolute values of the differences between pixels of a macro-block MB, obtained on dividing a reference side picture into plural 8×8 pixels and collecting 8×8×4 pixels of the luminance data and 8×8×2 pixels of the chrominance data, and pixels of a search side macro-block sliced with a motion vector as found on motion detection, and may be found by the following equation (1):

$$blockAD = \sum_{i=1}^{8} \sum_{j=1}^{8} (abs(ref[i,j] - search[i,j])) \quad (1)$$

where ref [i,j] is a pixel at the reference MB position (i,j) and search[i,j] is a pixel at the search MB position (i,j).

The absolute differences AD for respective blocks in the macro-block are summed and used as the absolute difference AD of the macro-block.

This parameter is used for estimating the quantity of the information taking into account the picture correlation in case of compression by inter-frame predictive coding or scene change judgment.

This parameter is also used for deciding the macro-block type, as later explained.

A parameter SAD for estimating the quantity of the picture information is the sum of the absolute differences AD in a picture, as shown by the equation (2):.

$$SAD = \Sigma Ad \quad (2)$$

Of course, the minimum distortion may also be employed in place of the absolute difference AD.

Then, at step S83, the sum of mean absolute values of the differences or the mean absolute difference (MAD) and activity are evaluated in the picture information evaluation circuit 50, in addition to the parameters found by the motion detection.

The mean absolute difference (MAD), which is a parameter for estimating the quantity of the information of the I-picture, is found for each of 8×8 blocks by the following equation (3):

$$blockMAD = \sum_{i=1}^{8}\sum_{j=1}^{8} |(X(i,j) - \bar{X})| \quad (3)$$

where X(i, j) is a pixel at (i, j) and $$\bar{X}$$

is a mean value of in-block pixels.

The mean absolute differences (MAD) for respective blocks in the macro-block may also be summed as shown by the equation (4):

$$MAD = \Sigma \ blockMAD \quad (4)$$

so as to be used for macro-block judgment.

The macro-block values are also summed in a picture as shown by the equation (5):

$$SMAD = \Sigma MAD \quad (5)$$

so as to be used as a parameter SMAD specifying the quantity of the information of the picture as an I-picture.

The activity is a parameter for quantitating the state of a picture by controlling the quantization step more finely in the picture depending upon the state of the partial picture of the macro-block for maintaining the picture quality and further raising the compression efficiency.

For example, distortion caused by quantization is more apparent in a flat portion of a partial picture in a block undergoing little level changes so that the quantization step should be reduced for this flat portion. Conversely, distortion in a block of a complicated pattern subjected to significant level changes is less apparent and the information quantity is also large so that the quantization step should be increased.

Thus a parameter representing block flatness, for example, is used as the activity.

Then at step S84, scene change detection is carried out by the scene change detection circuit 31. The scene change detection by the scene change detection circuit 31 is carried out using the parameter AD obtained by the picture information evaluation circuit 50. Specifically, the parameter SAD, which is a sum of the above parameter AD for the full picture, is used, and the scene change is detected based upon the rate of change of the parameter SAD.

The compression method selection circuit 32 determines the GOP length at step S85, and selects the compression method, that is the picture type, at step S86.

The GOP boundary (demarcation) is selected at this step at an interval of a suitable number of frames taking random accessibility into account during encoding. Since at least the first picture in the encoding sequence of the GOP must be the I-picture, the number of pictures is counted and picture type is periodically set to the I-picture.

On the other hand, if the picture correlation between neighboring pictures is lowered by scene change, compression encoding by the I-picture gives a higher efficiency. However, since the I-picture is low in compression efficiency, the picture quality is lowered if the I-pictures appear frequently for a low bit rate. Thus, if a scene change is detected by a scene change detection circuit 31, the compression method selection circuit 32 adaptively decides the GOP length for maintaining a suitable interval between the I-pictures.

At the next step S87, the compression method selection circuit 32 sums the total evaluation values (difficulty) shown in the flow chat of FIG. 8 as later explained and accordingly judges the macro-block type. That is, at step S87, the compression method selection circuit 32 decides the macro-block based compression method and the macro-block type.

The mean absolute difference MAD and the absolute difference AD found as described above are related with the data quantity obtained after compression by intra-frame coding and inter-frame predictive coding. Therefore, if these parameters are compared to each other, it can be determined which of the macro-block type by intra-frame coding or the macro-block type by inter-frame predictive coding gives a smaller data quantity.

At the next step S88, the quantization step controller 39 effects bit allocation for rate control. That is, the quantization step controller 39 effects bit allocation for each picture depending upon the difficulty as found at step S87.

The data size after compression encoding of each picture is varied significantly depending upon the information quantity and picture correlation of the original picture data and the encoding system, especially if the mean picture quality is to be maintained.

The variation in data size after picture-based compression encoding may be absorbed to some extent by the output buffer 18. However, a constant bit rate must be maintained on the average. Thus, for a given domain, the total post-compression picture data quantity is determined. Thus the post-compression data quantity, that is the number of bits that can be used for each picture, is determined for each picture using the picture type already set and the previously determined parameter on the picture information quantity.

A lesser quantity of bits is allocated to pictures having a smaller information quantity and a larger quantity of bits is allocated to pictures having a larger information quantity or to I-pictures. By this bit allocation, a constant bit rate may be maintained while suppressing variation in the picture quality.

For example, bit allocation is performed in the present embodiment in accordance with the following equations (6) and (7):

total bit count=(bit rate [bit/s]×number of pictures in GOP [picture])/(picture rate [picture/s]) bits  (6)

available bits=(total bit count×target picture information quantity parameter)/(sum of picture information quantity parameters over GOP) bits  (7)

The information quantity parameter employed in the equation (7) is the above-mentioned parameter SHAD or SAD multiplied by a picture-based multiplication coefficient. The multiplication coefficient adjusts the relation between the parameters and the picture quality from one picture type to another.

The sum total of the picture information quantity parameters over the GOP according to the equation (7) is found as shown by the equations (8):

sum total of picture information quantity parameters over GOP=
Ki×ΣDifi+Kp×ΣDifp+Kb×ΣDifb where Difi is the difficulty of the P-picture and Difb is the difficulty of the B-picture.

The quantization step controller 39 decides the basic quantization step at the next step S89 based upon the prediction of regression by the learning parameters A and B shown in the flow chart of FIG. 9 as later explained. That is, at the present step S89, the controller 39 determines (predicts) the basic quantization step by prediction of regression from the difficulty and the bit allocation for one full picture as described above.

Once the picture type and the macro-block type are determined as described above, the values of the mean absolute difference MAD and the absolute difference AD for one full picture may be summed depending upon the macro-block type for allowing to measure the information quantity parameter, that is difficulty, for one full picture. That is, the quantization step can be estimated if, from past records, the information quantity parameter and the post-quantization data quantity are determined.

The present invention is concerned with the basic quantization step decision mechanism. The quantization step controller 39 determines the basic quantization step for one full picture (quantization scale: Q_scale) from the allocated bit quantity for one full picture (allocated_bit) and the difficulty by the following method.

The relation shown by the equation (10):

$$\log (\text{allocated\_bit/difficulty}) = A^* \log (Q\_\text{scale}) + B \quad (10)$$

is assumed to hold, and A, B in the equation (10) are previously found by learning (experiments). The quantization scale (Q_scale) is found from the equation (11):

$$Q\_\text{scale} = \exp (\log (\text{allocated\_bit/difficulty}) - B)/A) \quad (11)$$

The quantization step thus found is used as the basic quantization step for the picture.

The quantization step controller 39 controls the quantization step in the picture at step S90.

That is, the quantization step controller 39 controls the quantization step in the picture on the block basis so that the picture quality and the compression efficiency will be as high as practicable. Specifically, the macro-block-based quantization step is added to or subtracted from the basic quantization step, based upon the information such as the activity or the macro-block type, for controlling the quantizer 15 as to the quantization step.

At the next step S91, the variable length encoding circuit 17 encodes picture data. Since all parameters for compression coding have been determined as described above, the picture data are encoded in accordance with the MPEG rule by way of data compression.

At the next step S92, the quantity of bits generated on the macro-block basis and the quantization scale (Q_scale) are summed together.

Finally, at step S93, the above-mentioned parameters are updated. That is, prediction sample are updated in accordance with the mean value of the quantization steps on the macro-block basis, sum total of the quantity of generated bits on the macro-block basis and difficulty, as shown in the flow chart of FIG. 10, as will be explained subsequently.

The relation between the quantity of the picture information, basic quantization step and the post-compression data quantity depends on the picture to be encoded for compression. Thus the actual post-compression data amounts of the parameters and prediction parameters, as used in the equation expressing the relation, are fed back for learning for improving prediction accuracy.

That is, the learning parameters A and B are fed back from one picture type to another for learning and correction.

If the average value of the macro-block-based quantization scale (Q-scale) is denoted as (average_Q) and the amount of generated bits after compressing one full picture is denoted as (generated bit), the relation shown in the equation (12):

$$x = \log (\text{average\_Q}), y = \log (\text{generated bit/difficulty}) \quad (12)$$

holds, such that the parameters A and B may be found by the least square error method in accordance with the equations (13) and (14):

$$A = (\text{sum}(x^*y) - (\text{sum}(x) * \text{sum}(y))/n)/(\text{sum}(x^*x) - (\text{sum}(x) * \text{sum}(x))/ (n)) \quad (13)$$

$$B = ((\text{sum}(y)/n) - a) * (\text{sum}(x)/n) \quad (14)$$

where n denotes the number of samples.

Figure 8:
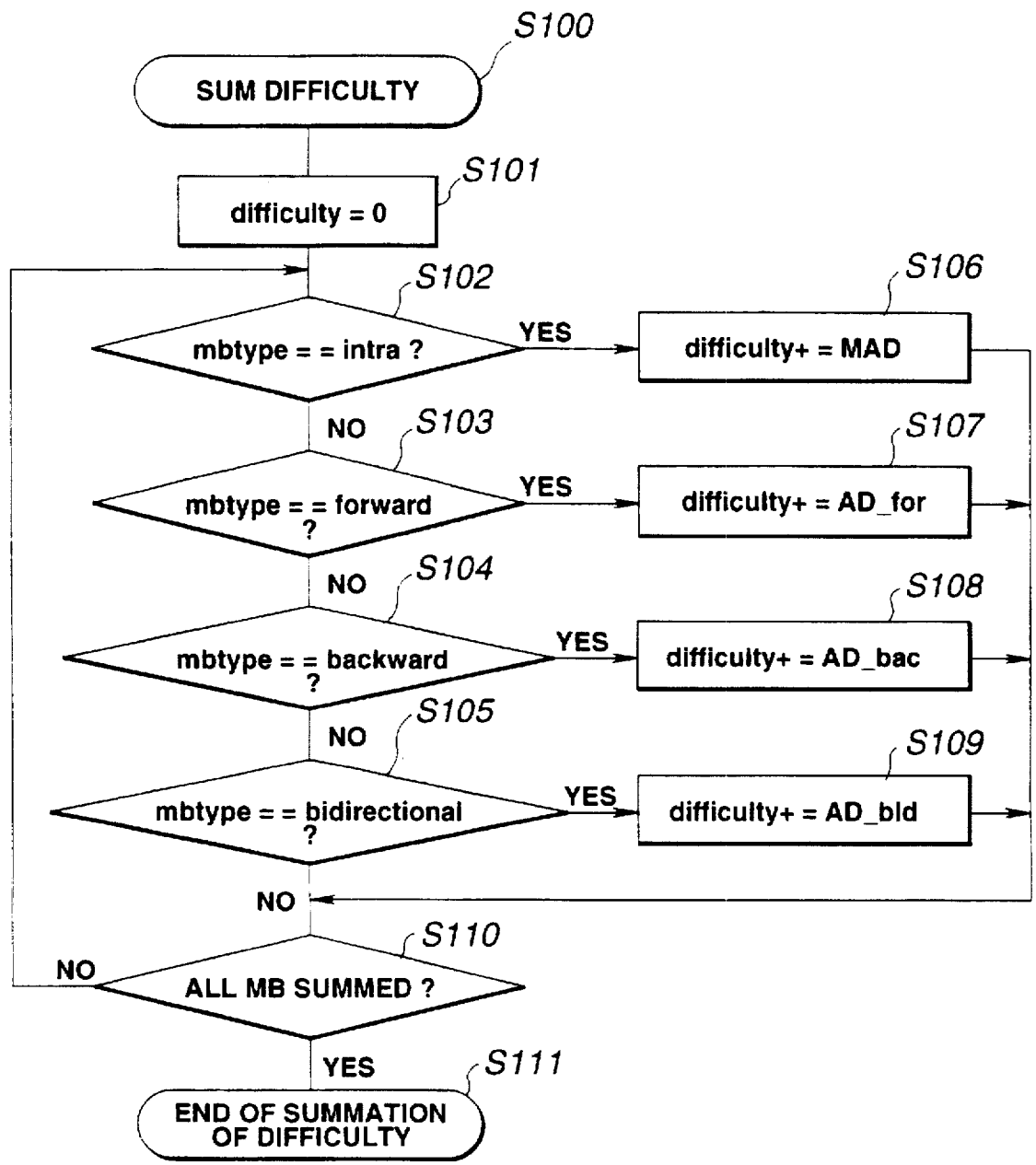
FIG. 8 is a flow chart for illustrating difficulty summing.

The difficulty summing at step S87 in FIG. 7 is explained by referring to the flow chart of FIG. 8.

If the program reaches the step S87 in FIG. 7 for summing the difficulty, it proceeds to the step S100 ff. of FIG. 8.

At step S101 of FIG. 8, difficulty is set to zero (difficulty=0) by way of initialization. At the next step S102, it is judged whether or not the macro-block type is the intra-frame coded macro-block (intra-macro-block or intra-MB). If the macro-block type is found to be the intra-macro-block, the program sets the difficulty at step S106 to the mean absolute difference (MAD) for one full picture, before proceeding to step S110. If the macro-block type is found not to be the intramacro-block, the program proceeds to step S103.

At step S103, the program judges whether or not the macro-block type is the forward predictively coded macro-block (forward MB) of the inter-frame predictively-coded macro-block. If the macro-block is found at step S103 to be a forward predictively coded macro-block, the program sets the difficulty to the absolute difference for the forward predictively coded macro-block (AD_for) before proceeding to step S110. If the macro-block is found at step S103 not to be a forward predictively coded macro-block, the program proceeds to step S104.

At step S104, the program judges whether or not the macro-block type is the backward predictively coded macro-block (backward MD) of the inter-frame predictively-coded macro-block. If the macro-block is found at step S104 to be a backward predictively coded macro-block, the program sets the difficulty to the absolute difference for the backward predictively coded macro-block (AD_bac) before proceeding to step S110. If the macro-block is found at step S104 not to be a backward predictively coded macro-block, the program proceeds to step S105.

At step S105, the program judges whether or not the macro-block type is the bi-directionally predictively coded macro-block (bi-directional MB) of the inter-frame predictively-coded macro-block. If the macro-block is found at step S105 to be a bi-directionally predictively coded macro-block, the program sets the difficulty to the absolute difference for the bi-directionally predictively coded macro-block (AD_bid) before proceeding to step S110. If the macro-block is found at step S105 not to be a bi-directionally predictively coded macro-block, the program proceeds to step S110.

At step S110, it is judged whether or not the difficulty summing for the entire macro-blocks has come to a close. If the summing is judged not to have come to a close, the program reverts to step S102. If the summing is judged to have come to a close, the program terminates the difficulty summing at step S111 before reverting to step S87.

Figure 9:
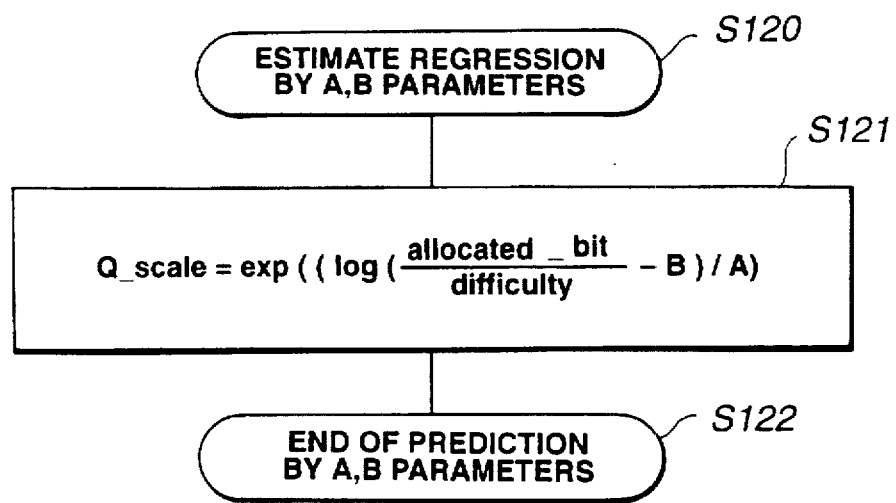
FIG. 9 is a flow chart showing regression prediction by learning parameters A and B.

Referring to the flow chart of FIG. 9, the prediction of regression by the parameters A and B at step S89 in FIG. 7 is explained.

If the program proceeds at step S89 to regression prediction by the learning parameters A and B, it proceeds to steps S120 ff. of FIG. 9.

At step S121 of FIG. 9, the operation of the equation (11) is executed. At the next step S122, regression prediction by the leaning parameters A and B obtained by the operation of the equation (11) is terminated to revert to step S89 of FIG. 7.

Figure 10:
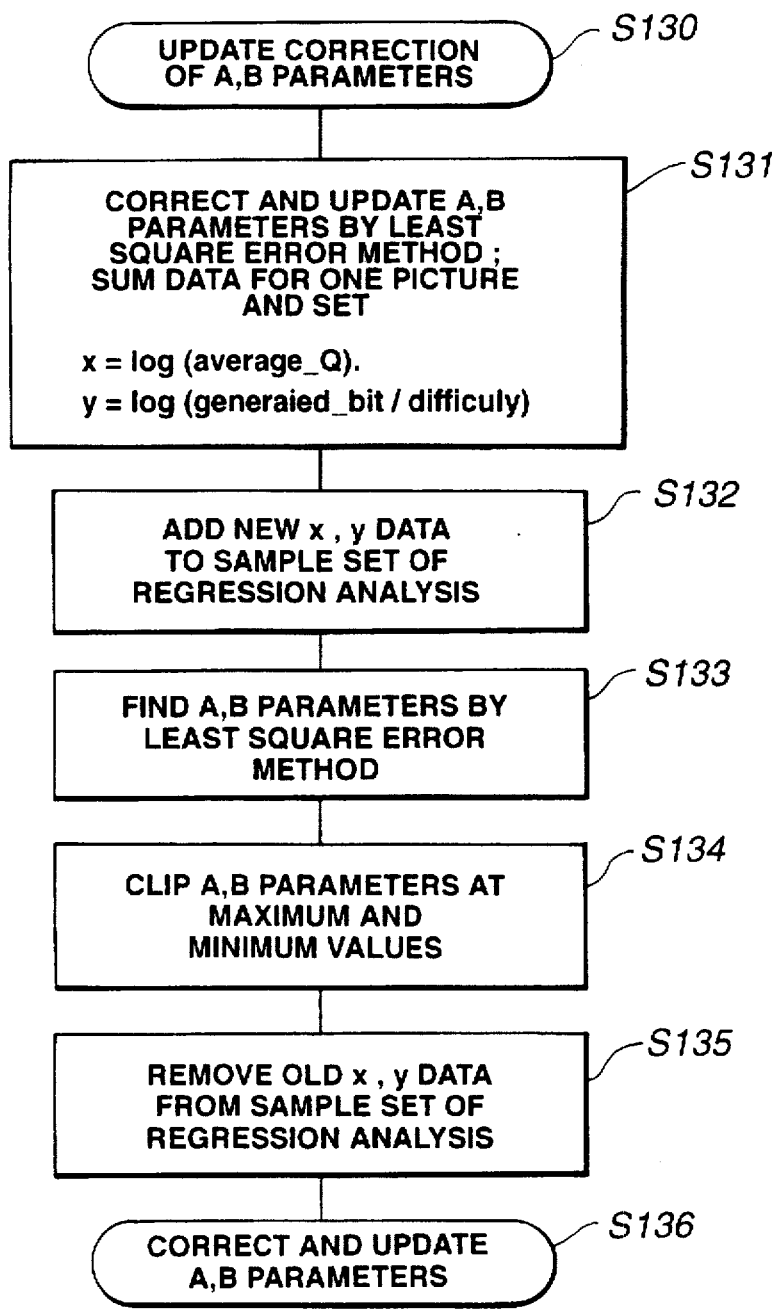
FIG. 10 is a flow chart showing correction and updating of learning parameters A and B.

Referring to a flow chart of FIG. 10, correction and updating of the learning parameters A, B at step S93 in FIG. 7 is explained. That is, in the flow chart of FIG. 10, new samples are added to the set of samples. The parameters A and B are found by the least square error method, and old samples are removed from the sample set for correction/updating of the learning parameters for regression prediction.

If the program proceeds to correction/updating of the learning parameters A and B at step S93 of FIG. 7, it proceeds to processing of the step S130 ff. of FIG. 10.

At step S131 of FIG. 10, the learning parameters A and B are corrected/updated by the least square error method. The one-picture data are summed and x, y data are set as shown by the equations (15) and (16):

$$x = \log(\text{average} \_Q) \quad (15)$$

$$y = \log(\text{generated\_bit/difficulty}) \quad (16)$$

At the next step S132, the new x and y data are added to the set of samples for regression analysis. At the next step S133, the learning parameters A and B are calculated by the least square error method. At the next step S134, the learning parameters A and B are clipped at maximum and minimum values, and old x and y data are discarded at step S135 from the set of samples for regression analysis. Then, at step S136, the correction/updating of the learning parameters A and B are terminated so that the program reverts to step S93 of FIG. 7.

The relation between the quantization scale (Q_scale) and the quantity of generated bits, found as described above, is as shown in FIG. 11.

Briefly, the picture encoder of the embodiment illustrated is configured for predicting the basic quantization step from the parameter estimating the information quantity of the input picture data (evaluated value) and the pre-set post-quantization quantity of compressed picture data highly accurately at the time of controlling the basic quantization step.

For accurate prediction of the basic quantization step, the relation between the parameter estimating the information quantity of the input picture data, the quantization step actually used for compression and the post-compression data quantity is learned. For predicting the basic quantization step, the difficulty is found from picture to picture by summing, for one full picture, the absolute difference (AD) or the mean absolute difference (MAD), depending on the determined macro-block type, by way of estimating the information quantity of the input picture type. In addition, the picture-based allocated bit quantity (allocated_bit) and difficulty are summed for one full picture and bit allocation is performed in dependence upon the difficulty over one full GOP.

In the present encoder, it is assumed that, from the quantity of allocated bits (allocated_bit) and difficulty, the relation of the equation (10) holds on the picture type basis, and the parameters A and B are found by learning. Besides, the basic quantization scale (Q_scale) is found from the equation (11) modified from the equation (11). The macro-block-based learning parameters A and B can be found by the least square error method from the macro-block-based mean values of the quantization steps and the quantity of generated bits after compression of one full picture.

Figure 11:
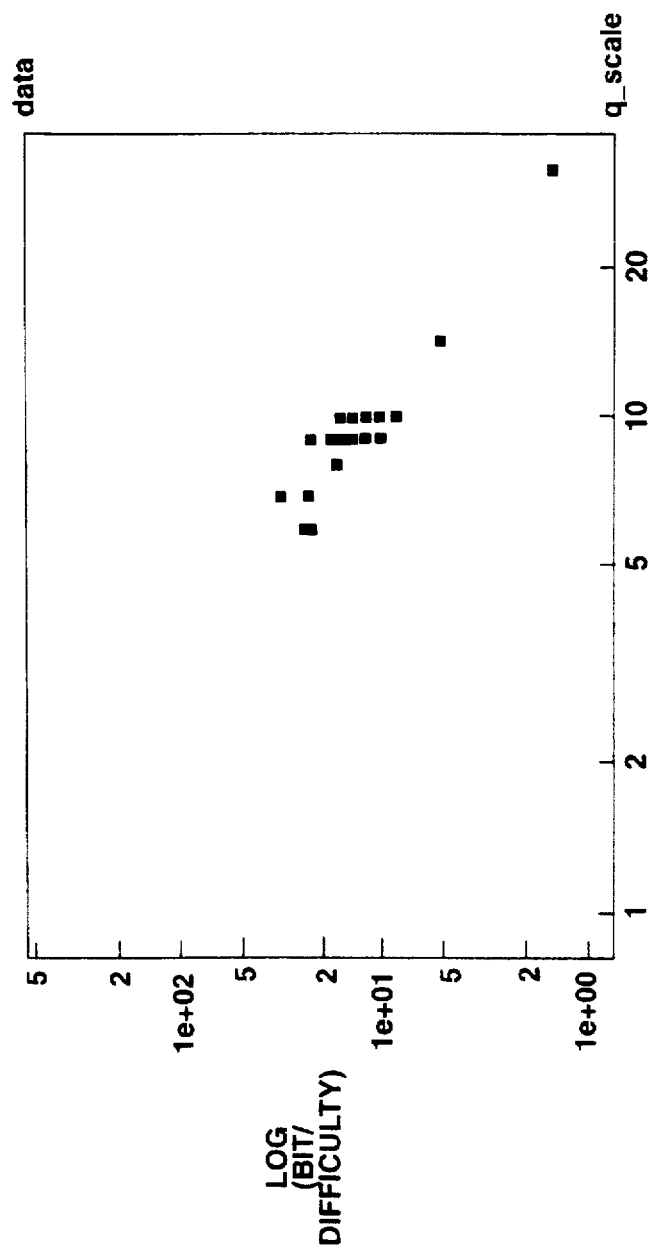
FIG. 11 illustrates the relation between the quantity of generated bits and the basic quantization scale.

In addition, learning and correction of the learning parameters A and B are achieved from data continuing for latest n seconds for each picture type. That is, past data other than data for the latest n seconds are not used. At this time, past data are plotted as shown in FIG. 11, and mean data of the maximum and minimum values of the basic quantization scale (Q_scale) of an area in the graph which presumably allows for linear approximation is inserted into a sample set for stabilizing an approximate prediction line. Upper and lower limits are set in the learning parameters A and B so that stabilized quantization step prediction can be achieved even if a large quantity of unique data is entered.

It is seen from above that, with the present encoder, since the basic quantization step can be predicted accurately, the amount of bits can be drawn closer to the estimated post-compression bit quantity allocated to a full picture even although the quantization step is not controlled within the picture. Thus there is no risk of over-consumption or redundancy of bits in each picture so that a mean picture quality may be maintained. Even although the quantization step control is carried out successfully in the picture, quantization step variation is incurred in the picture if the estimation of the basic quantization step is upset significantly, thus producing a data-compressed picture with apparent non-uniformity in the picture quality. Since the bit allocation is carried out in the present embodiment in dependence upon the difficulty in compression, the basic quantization step can be predicted accurately, with the result that the bits can be used efficiently and hence a picture with less apparent non-uniformity in the picture or from picture to picture can be produced.

In addition, the mechanism of accurately predicting the basic quantization step in the illustrated embodiment effects correction and learning of varying input pictures in order to follow the input pictures, the basic quantization step can be predicted highly accurately.

With the present encoder, the mechanism of accurately predicting the basic quantization step is not interested in the past learning results and uses the effects of the latest input pictures for learning, thus realizing prediction of the basic quantization step for quickly following the input picture.

With the present encoder, the mechanism of accurately predicting the basic quantization step updates the approximate prediction line from numerous experimentally acquired learning data with the learning data of the latest input pictures. Besides, the experimentally found approximate prediction line includes input data closer to the maximum and minimum values of x and y data. Consequently, should any unique learning data of the input picture be entered for the least square error method susceptible to experimental effects, the basic quantization step can be predicted without being affected by peculiar learning data of the input picture.

With the picture encoder of the illustrated embodiment, the parameters A and B can be ultimately clipped for discarding any abnormal results of learning even although the approximate prediction line is such that suppression of the variation in the parameters A and B as found from x and y in the vicinity of the experimentally found maximum and minimum values is not effective.

With the present picture encoder, the basic quantization step can be predicted accurately by evaluating the information quantity from the stored data of plural pictures, detecting the picture correlation, adaptively selecting the picture data compressing methods based upon the evaluated value of the information quantity and the information on inter-picture correlation, and predicting the basic quantization step from the evaluated value and the pre-set compressed data quantity obtained by compressing the one-picture picture data by the selected compression method. The estimated post-compression bit quantity allocated to one full picture can be approached without specifically controlling the quantization step in a picture so that picture-based bit over-consumption or redundancy is less likely to be incurred and hence the average picture quality may be maintained. The result is that picture data compression can be achieved with high efficiency, thereby improving the picture quality on the whole.

With the picture encoder of the illustrated embodiment, the relation between the quantization step actually employed for compression, the post-compression data quantity and the evaluated values is learned, and the basic quantization step prediction is carried out in dependence upon the learned results, so that varying input pictures can be followed, while the basic quantization step can be predicted accurately.

In addition, since the information produced during the past n seconds is used for learning for each of the compression methods as selected by the compression method selection circuit, the basic quantization step prediction can be performed so as to follow the input picture quickly without being affected by the past results of learning.

Furthermore, since the prediction of the basic quantization step is performed with the present encoder by employing the information acquired during the past n seconds for each of the compression methods as selected by the compression method selection circuit, the prediction can be achieved without being affected by learning data of peculiar input picture data. Since upper and lower limits are set for the tilt and offset of the approximate straight prediction line, the parameters can be ultimately clipped if the prediction line is beyond the range of variation suppression in the learning parameters, without storing abnormal learning results, thus enabling accurate prediction of the basic quantization step.

What is claimed is:

1. Apparatus for encoding a picture comprising:

picture data storage means for storing picture data of a plurality of input pictures to provide stored picture data;

picture information evaluating means for evaluating the information quantity of said stored picture data to generate an evaluated value of information quantity;

inter-picture correlation detection means for detecting the correlation between pictures of said stored picture data to generate inter-picture correlation information;

orthogonal transform means for orthogonally transforming said stored picture data to generate orthogonal transform coefficients;

quantization means for quantizing said orthogonal transform coefficients at a pre-set quantization step;

compression method selection means for adaptively selecting compression methods for said stored picture data as a function of said evaluated value of information quantity and said inter-picture correlation information to provide selected compression methods; and quantization step control means for learning the relation between a quantization step employed for compression, a post-compression data quantity and said evaluated value of information quantity to generate learning parameters and predicting a basic quantization step for said quantization means as a function of said learning parameter; wherein said quantization step control means sums said evaluated value of information quantity for each macro-block obtained from dividing said picture and said evaluated value of information quantity for a full picture during a time interval corresponding to a period of intra-frame coding to allocate bits for quantization; wherein the quantity of picture-based bit allocation for quantization and the sum of evaluated values are related in a pre-set manner for each of said selected compression methods to generate summed evaluated value; wherein said quantization step control means previously determines said learning parameters by least square error method from average value of the macro-block-based quantization step over a full picture, post-compression data quantity of said full picture and said evaluated value of information quantity for said full picture to generate said previously determined learning parameters and calculates said basic quantization step of said full picture from said previously determined learning parameters and said pre-set relation.

2. The apparatus as claimed in claim 1, wherein said quantization step control means determines said learning parameters from prior n seconds of the information for each of said selected compression methods.

3. The apparatus as claimed in claim 1, wherein said quantization step control means predicts the basic quantization step as a function of previously determined plural quantization steps, the quantity of generated bits and the information quantity.

4. The apparatus as claimed in claim 1, wherein said quantization step control means sets upper and lower limits for the offset and the inclination of a straight line segment used for prediction.

* * * * *